(12) United States Patent
Chang

(10) Patent No.: US 7,717,134 B2
(45) Date of Patent: May 18, 2010

(54) QUICK DRAINING AIR VALVE

(75) Inventor: Ming-Lung Chang, Taipei County (TW)

(73) Assignee: Apex Medical Corp., Taipei (TW)

(*) Notice: Subject to any disclaimer, the term of this patent is extended or adjusted under 35 U.S.C. 154(b) by 671 days.

(21) Appl. No.: 11/726,463

(22) Filed: Mar. 23, 2007

(65) Prior Publication Data
US 2008/0078966 A1  Apr. 3, 2008

(30) Foreign Application Priority Data
Sep. 29, 2006  (TW) ............... 95217385 U

(51) Int. Cl.
*F16K 11/10* (2006.01)
(52) U.S. Cl. .......................... 137/861; 5/713
(58) Field of Classification Search .......... 137/861; 5/713
See application file for complete search history.

(56) References Cited

U.S. PATENT DOCUMENTS

| | | | |
|---|---|---|---|
| 5,090,076 A * | 2/1992 | Guldager | 5/713 |
| 6,439,264 B1 * | 8/2002 | Ellis et al. | 137/596.2 |
| 6,772,812 B1 | 8/2004 | Hamilton | |
| 7,225,488 B2 * | 6/2007 | Wu | 5/713 |
| 7,284,968 B2 * | 10/2007 | Tsai | 417/423.14 |
| 7,426,766 B2 * | 9/2008 | Gammons | 5/713 |
| 2005/0109398 A1 | 5/2005 | Huang | |

FOREIGN PATENT DOCUMENTS

| | | |
|---|---|---|
| GB | 2428193 | 1/2007 |
| GB | 0713082.6 | 4/2008 |

* cited by examiner

*Primary Examiner*—John Fox
(74) *Attorney, Agent, or Firm*—C. G. Mersereau; Nikolai & Mersereau, P.A.

(57) ABSTRACT

A quick draining air valve comprises a first valve having an air inlet device for inputting high pressure air; a second valve having at least one channel which is extended to a surface of the second valve; a distal end of the channel extending with a tube which is connected to the air inflation tube; the second valve being connected to the first valve so that high pressure air enters into the tube through the channel and then into the air inflation tube; and a cover plate being openable, high pressure air providing by the first valve being drained out with a high speed from the second valve; by the channel of the second valve, residue air in the air inflation tube connected to the tube of the second valve is drained out from the second valve.

11 Claims, 10 Drawing Sheets

QUICK DRAINING AIR VALVE

FIELD OF THE INVENTION

The present invention relates to air inflation beds, and particularly to a quick draining air valve of an air inflation bed which can drain air in the bed in emergency.

BACKGROUND OF THE INVENTION

With referring to FIG. 9, an air inflation bed for patients is illustrated, where the bed has a plurality of transversally arranged air inflation tubes 9 which are formed as a bed surfaces. A periphery of the tubes 9 are enclosed by air inflation strips 92 so as to prevent from getting bedsore. The air inflation tubes have the effect of air inflation and releasing.

Referring to FIG. 9A, the tubes 91 includes an upper air chambers 91a and a lower air chambers 91b. The upper air chambers 91a can be inflated with air and air therein can be released. The lower air chambers 91b is retained with sufficient air. To retain the health of the patients, the upper air chambers 91a are used to inflate air, and the lower air chambers 91b serve to release air, referring to the arrows in the drawing. The air inflation and releasing are performed regularly and alternatively so that the skins of the patient are comfortable.

An air valve 94 with three holes is connected to an air compressor 93. The air inflation tube 94a is retained with high pressure air and is communicated with the lower air chambers 91b and the air inflation strips 92. The right and left air inflation tubes 94b and 94c are connected to the upper air chambers 91a. Furthermore, by an air distributor in the air valve 94, the releasing of air is controllable.

However when it is desired to perform cardiopulmonary resuscitation for an emergency, the residue air in the bed must be drained out. Conventionally, the pipes connected to the valve 94 is removed so that air in the bed is released naturally, but it is too slow to perform the cardiopulmonary resuscitation. The time required is about one minute. Thus it is possible that the patient can not be rescued.

SUMMARY OF THE INVENTION

Accordingly, the primary object of the present invention is to provide a quick draining air valve, wherein the quick draining air valve has a first valve and a second valve. In emergency, a cover plate is opened so that air guide hole of the air guide plate are opened. The high pressure air is drained out from the air guide holes of the air guide plate so that the residue air in the first tubes connected to air inflation tubes pass through the air channels are driven by the high pressure air drained from the air holes of the second valves so as to be drained out of the second valve through the air guide holes so as to reduce the draining time of the air cushion bed.

The quick draining air valve of the present invention can be used to an air inflation bed. In emergency, the cover plate is opened for draining air quickly and thus the CPR can be performed to the patient.

To achieve above objects, the present invention provides a quick draining air valve, comprises a first valve having an air inlet device for inputting high pressure air; a second valve having at least one channel which is extended to a surface of the second valve; a distal end of the channel extending with a tube which is connected to the air inflation tube; the second valve being connected to the first valve so that high pressure air enters into the tube through the channel and then into the air inflation tube; and a cover plate being openable, high pressure air providing by the first valve being drained out with a high speed from the second valve; by the channel of the second valve, residue air in the air inflation tube connected to the tube of the second valve is drained out from the second valve.

Furthermore, in the present invention, the cover plate is pivotally connected to an air guide plate and is buckled to a buckling block of the air guide plate by using a buckling plate so that the cover plate can be opened conveniently.

The various objects and advantages of the present invention will be more readily understood from the following detailed description when read in conjunction with the appended drawing.

BRIEF DESCRIPTION OF THE DRAWINGS

FIG. 9a is a cross sectional view showing the air flow in the air inflation bed according to the present invention.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
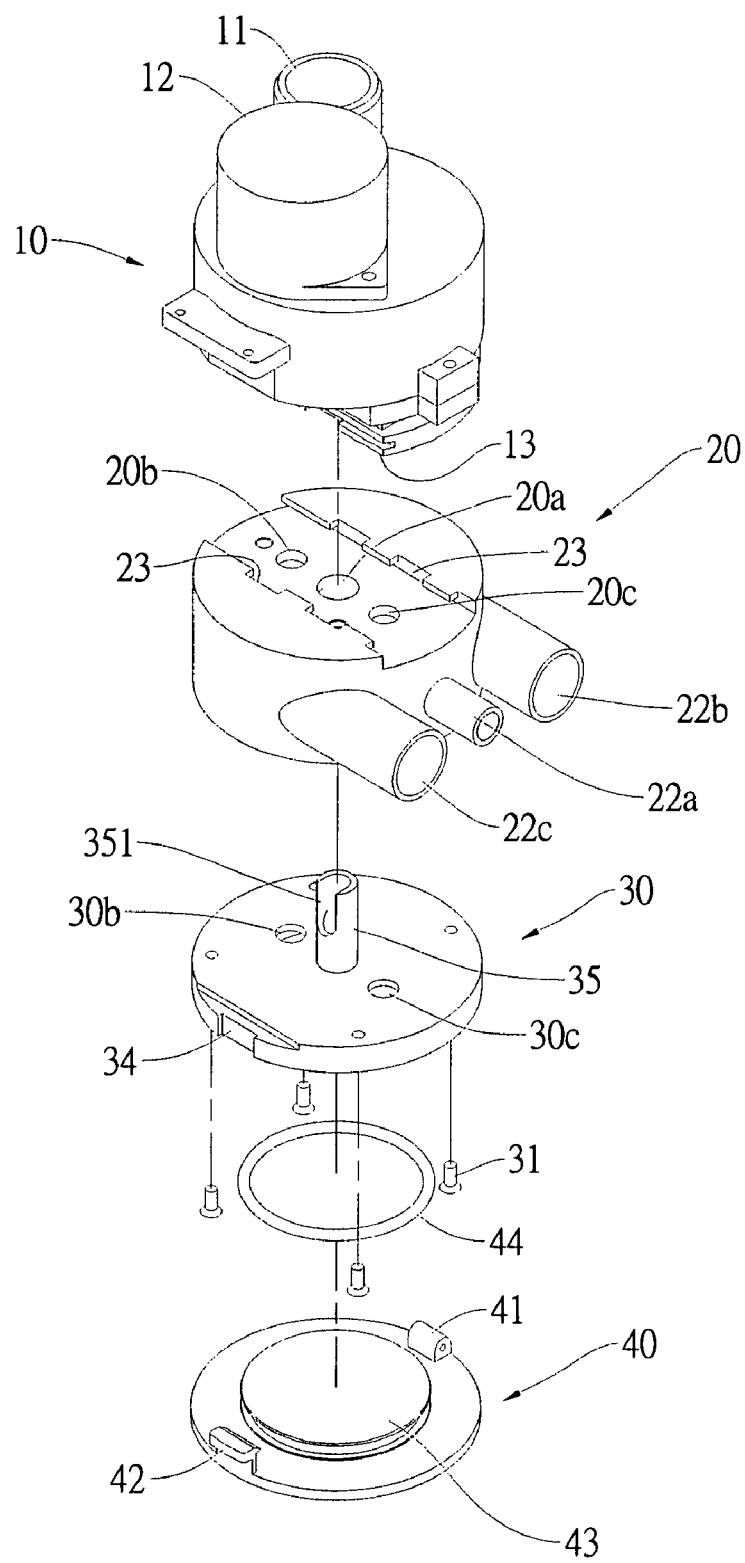
FIG. 1 is a perspective view of the quick draining air valve of the present invention.
Figure 2:
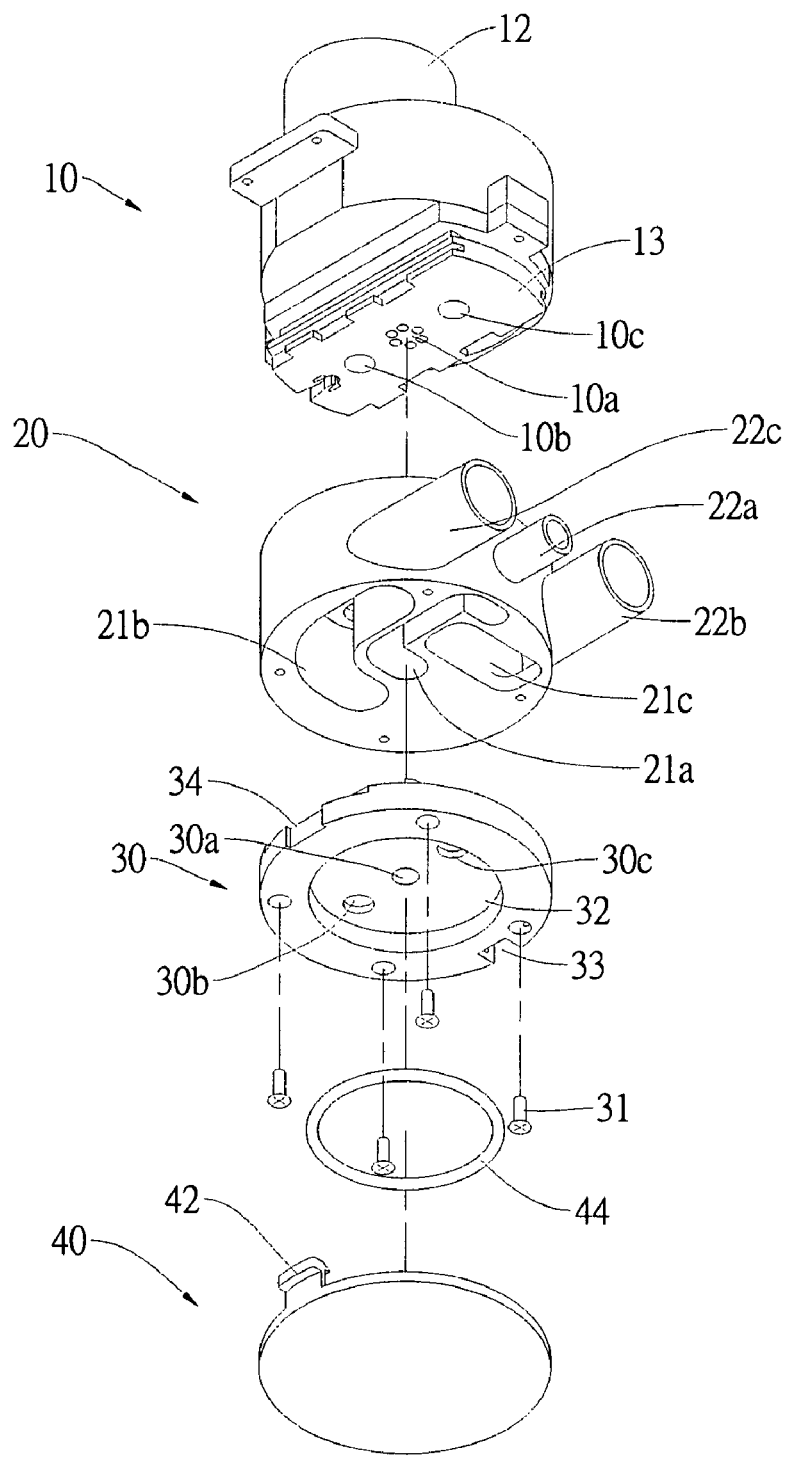
FIG. 2 is a further perspective view of the quick draining air valve of the present invention.
Figure 3:
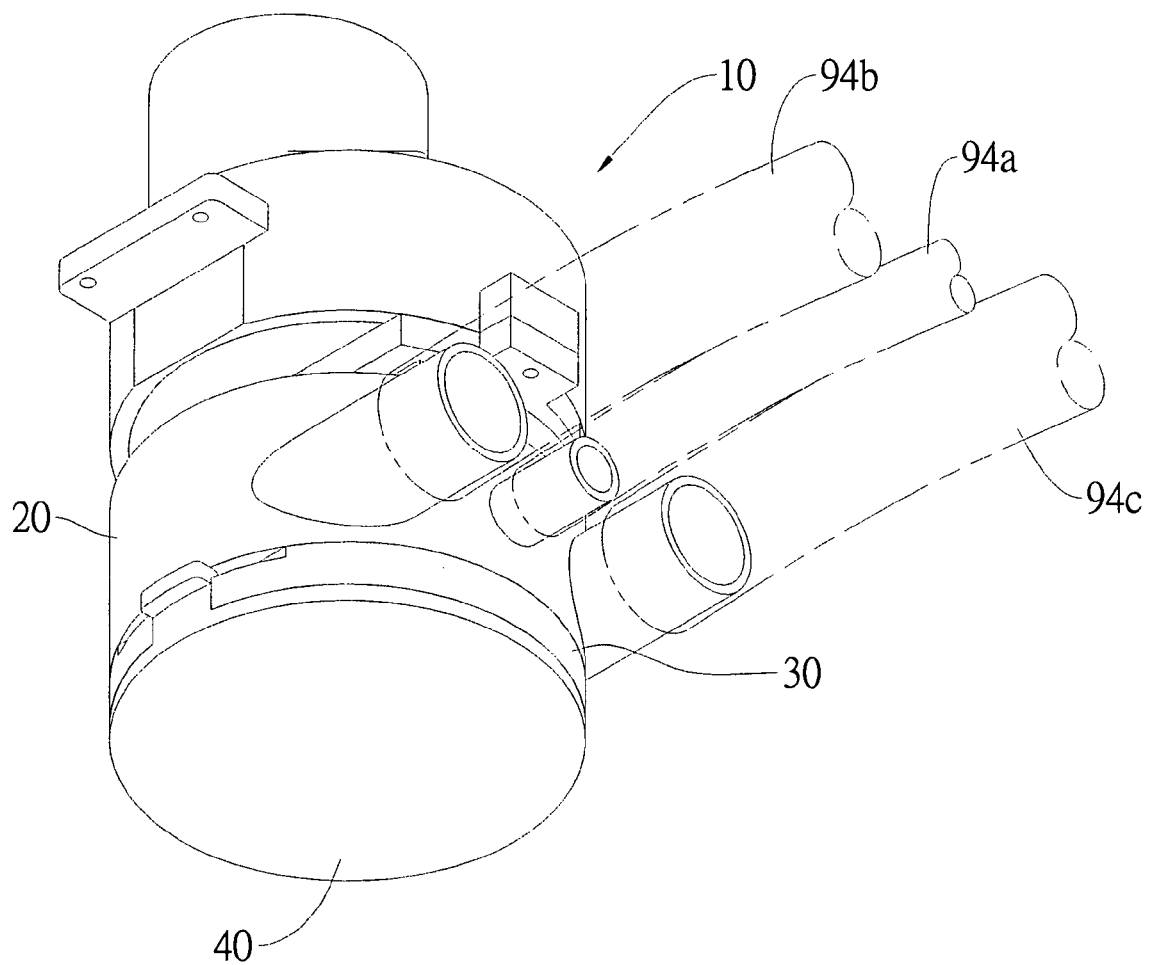
FIG. 3 is an assembled view of the quick draining air valve of the present invention.

With referring to FIGS. 1 to 3, the air hole of the present invention has the following elements.

Figure 4:
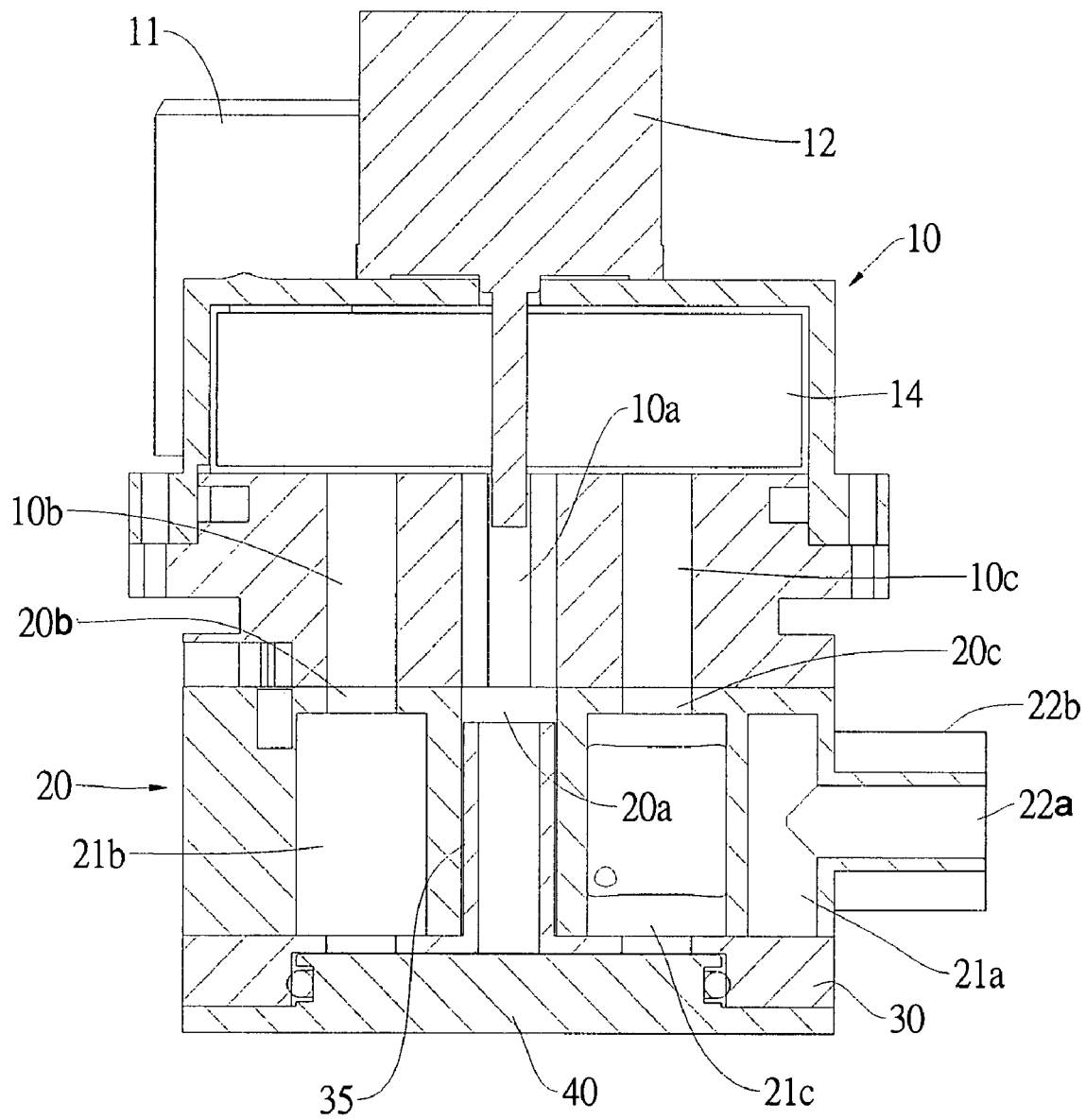
FIG. 4 is an assembled cross sectional view of the quick draining air valve of the present invention.

A first valve 10 has an air inlet device 11 which is connected to an compressor for providing air. An interior of the first valve 10 has an air distributor 14 which is driven by a motor 12 (referring to FIG. 4) so that high pressure air is distributed to a first air hole 10a, a second air hole 10b and a third air hole 10c at a bottom thereof. A bottom of the first valve 10 is formed with a connecting block 13. The first air hole 10a, second air hole 10b and third air hole 10c are opened on the connecting block 13. The first air hole 10a provides high pressure air constantly. The second air hole 10b and third air hole 10c provide high pressure air alternatively.

Figure 5:
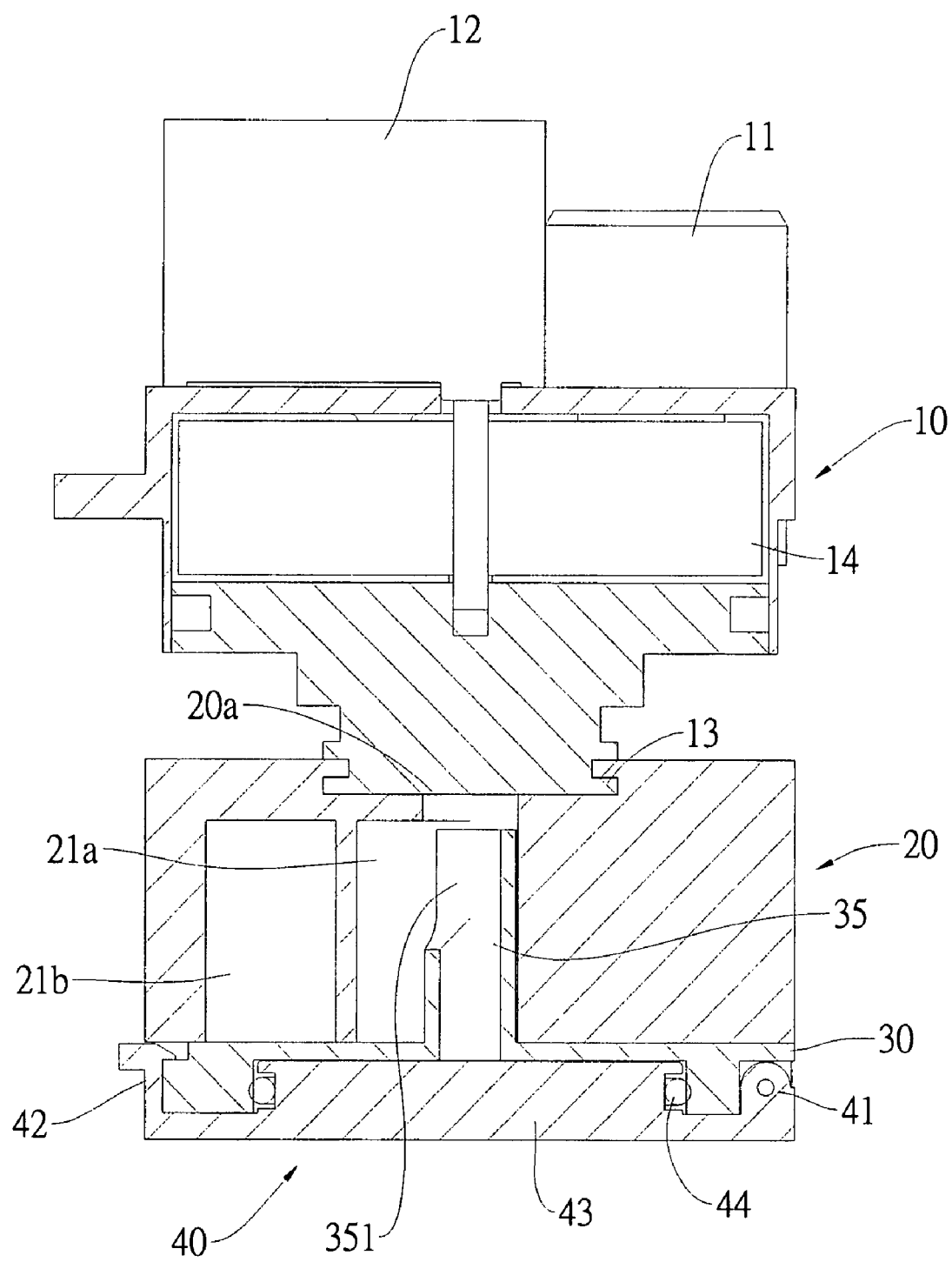
FIG. 5 is a further assembled cross sectional view of the quick draining air valve of the present invention.

A top of the second air hole 10b has a pair of buckling grooves 23 for buckling the connecting block 13 of the first valve 10 so that the first valve 10 and the second valve 20 are combined tightly, as illustrated in FIG. 5. A top of the second valve 20 has a first air hole 20a, a second air hole 20b, and a second air hole 20b corresponding to the first air hole 10a, second air hole 10b and third air hole 10c of the first valve 10. When the first valve 10 is combined with the second air hole 10b, the first air hole 20a, second air hole 20b and third air hole 20c of the second valve 20 of the second valve 20 are air-tightly connected to the first air hole 10a, second air hole 10b and third air hole 10c of the first valve 10, respectively. The second valve 20 is formed with a first channel 21a, a second channel 21b, and a third channel 21c. Front ends of the first channel 21a, second channel 21b and third channel 21c are communicated to the first air hole 20a, second air hole 20b and third air hole 20c of the second valve 20 (referring to FIGS. 2 to 4). The first channel 21a, second channel 21b and third channel 21c are also connected to the first tube 22a, second tube 22b and third tube 22c at one lateral side of the second valve 20 so as to drain high pressure air to an air cushion through air inflation pipes (referring to 94a to 94c of FIG. 3 or 9).

An air guide plate 30 is fixed to a bottom of the second valve 20 by using screws 31 for sealing the first channel 21a, second channel 21b and third channel 21c. A bottom of the air guide plate 30 is formed with recess 32. A recess surface of the recess 32 is formed with a first air guide hole 30a, a second air guide hole 30b and a third air guide hole 30c which are aligned to the first air hole 20a, second air hole 20b and third air hole 20c of the second valve 20. An upper side of the first air guide hole 30a is extended with a guide tube 35 having a notch 351. The guide tube 35 extends into the first channel 21a of the second valve 20. A distal end of the guide tube 35 is near the first air hole 20a of the second valve 20. Two sides of the air guide plate 30 are installed with a pivotal groove 33 and a buckling block 34, respectively.

A cover plate 40 has a pivotal seat 41 at one side thereof for pivotally connecting the pivotal groove 33 of the air guide plate 30 so that the cover plate 40 is rotatable along the pivotal seat 41. Besides, another side of the cover plate 40 opposite to the side installing the pivotal seat 41 is installed with a buckling plate 42. When the cover plate 40 covers upon the air guide plate 30, the buckling plate 42 is buckled with the buckling block 34 so that the cover plate 40 is steadily retained. A top surface of the cover plate 40 is formed with a protrusion 43. When the cover plate 40 is covered, the protrusion 43 exactly enters into the recess 32. A periphery of the protrusion 43 is enclosed by an air-tight washer 44.

Figure 9:
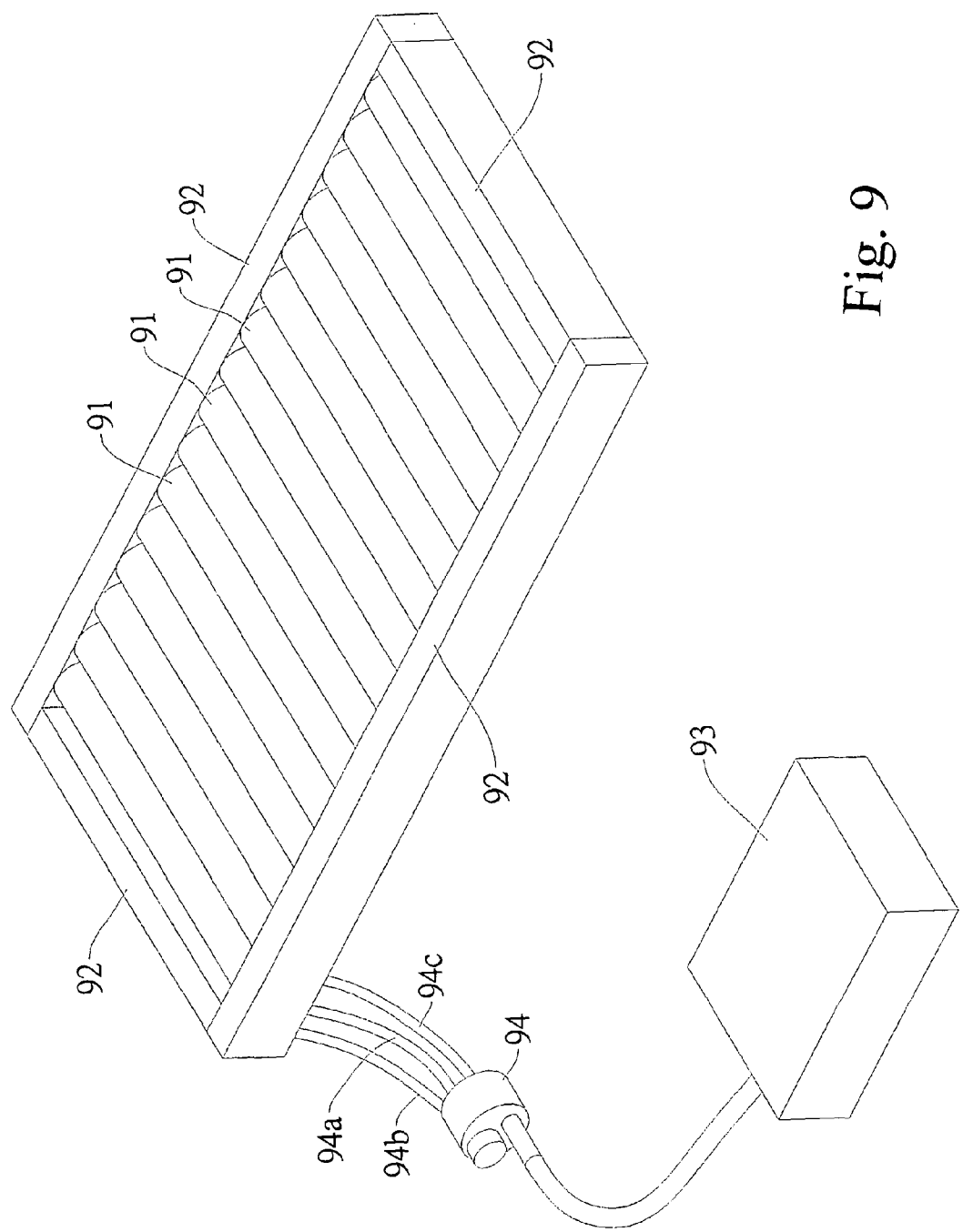
FIG. 9 shows the application of the present invention.
Figure 9:
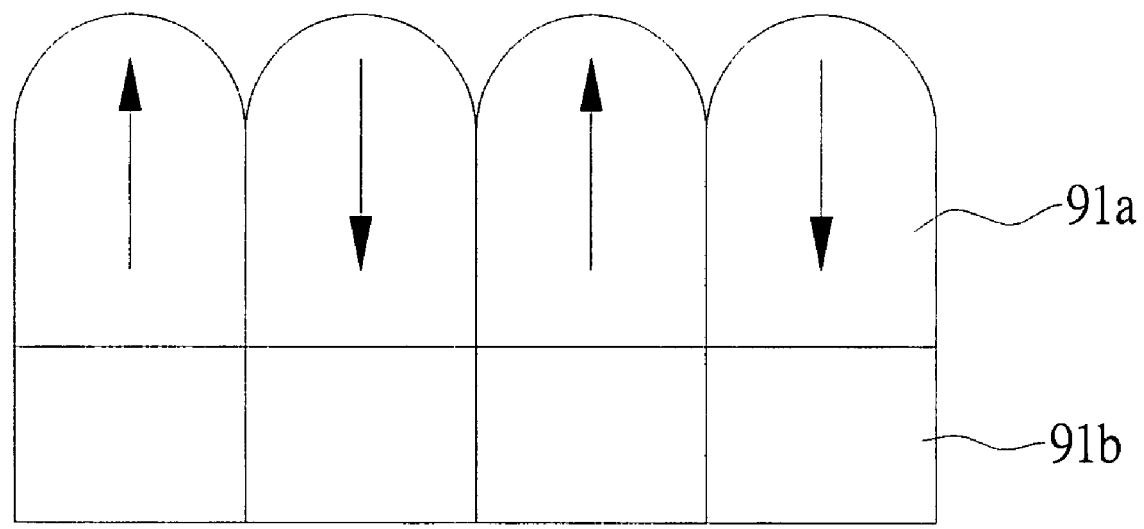

Referring to FIG. 9, in the present invention, the air inlet device 11 is connected to an air compressor 93 for providing high pressure air. The first tube 22a extending from the second valve 20 provides high pressure air continuously. The first tube 22a is connected to the lower air chamber 91b and fixed air inflation tubes 92 through the air inflation tube 94a. The second tube 22b and third tube 22c are connected to the upper air chambers 91a through the air inflation tubes 94b and 94c for inflating air alternatively.

Figure 6:
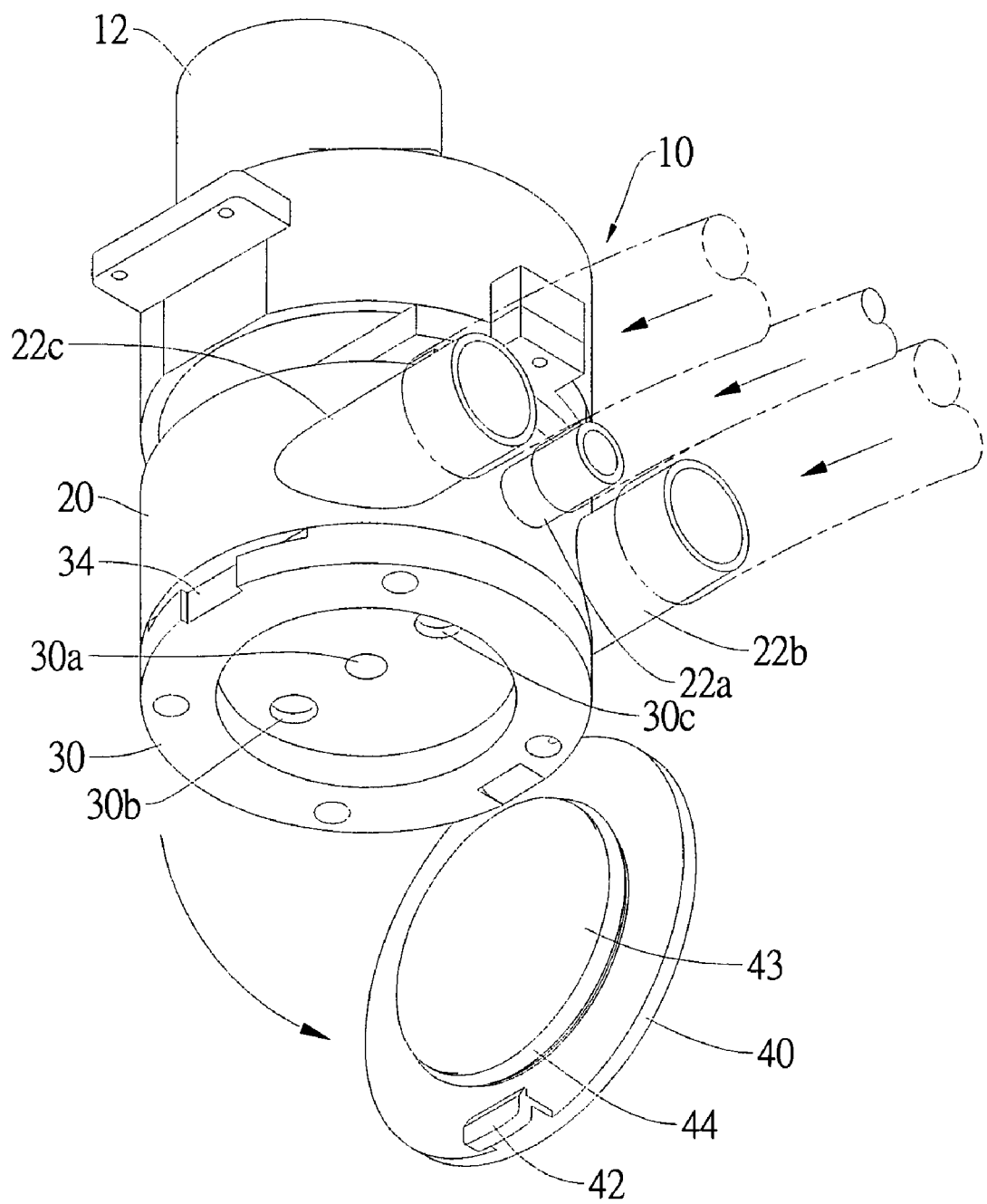
FIG. 6 is an assembled perspective view of the present invention, where the cover plate is opened.
Figure 7:
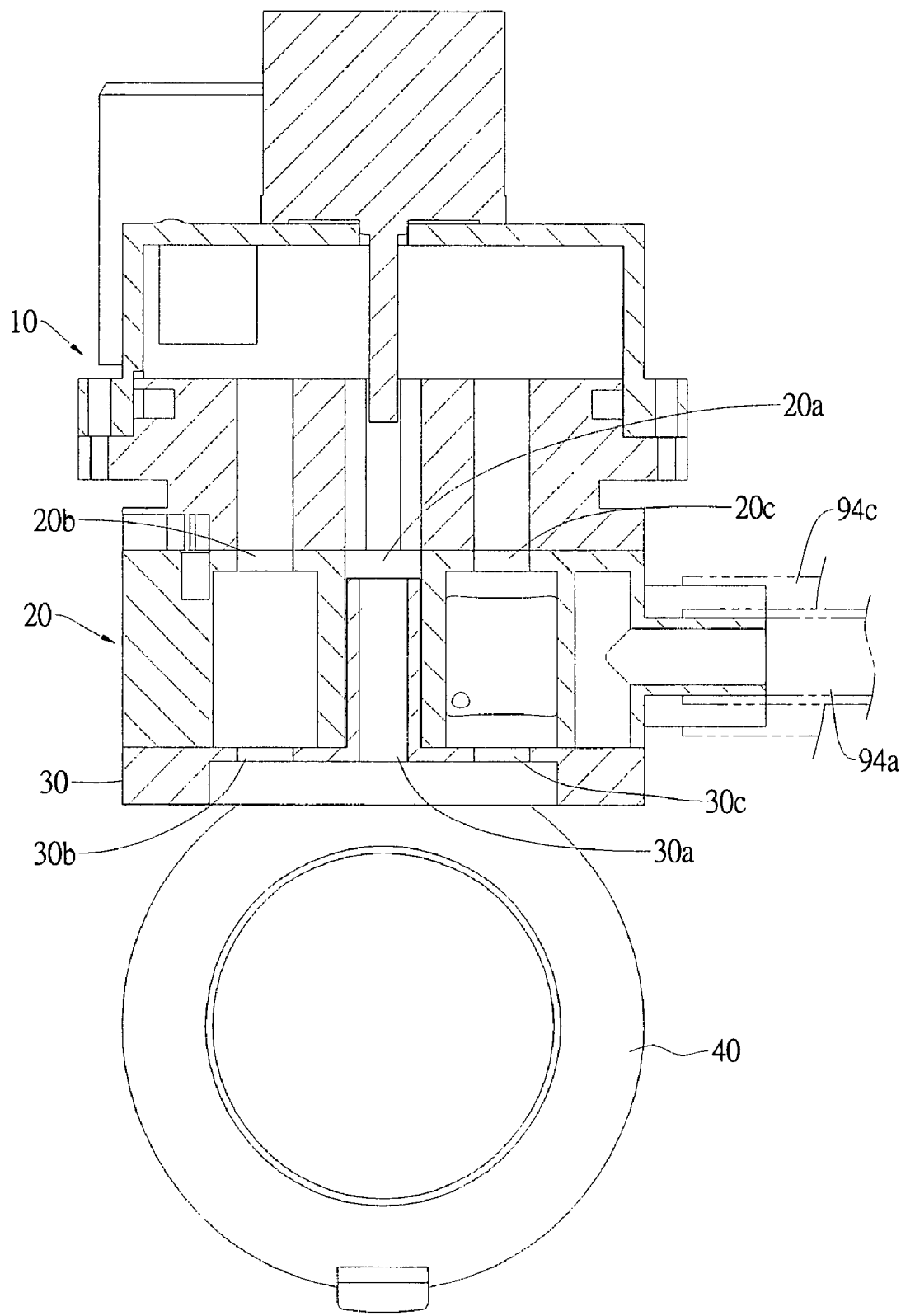
FIG. 7 is an assembled cross sectional view of the present invention, where the cover plate is opened.
Figure 8:
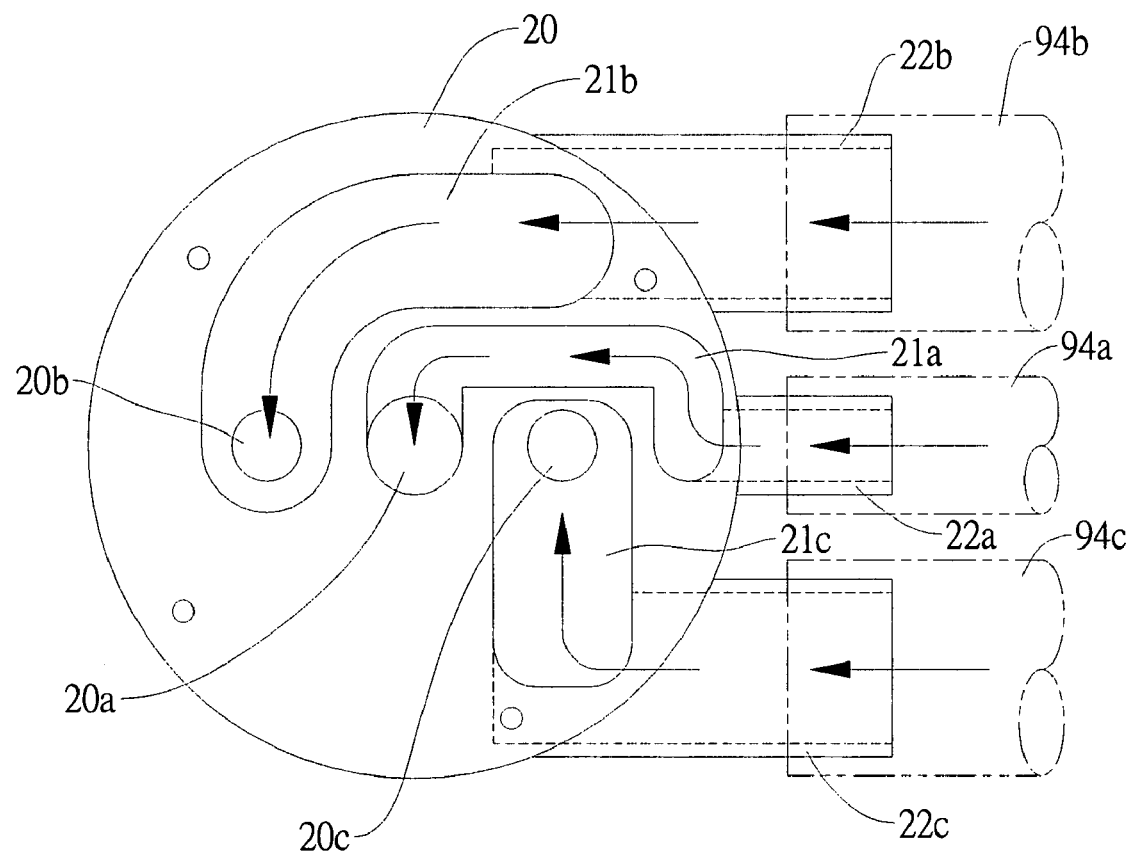
FIG. 8 shows the air flow path of the present invention.

In emergency, as illustrated in FIG. 6, the cover plate 40 is opened so that the first air guide hole 30a, second air guide hole 30b and third air guide hole 30c of the air guide plate 30 are opened. Referring to FIG. 8, since the first air hole 20a, second air hole 20b and third air hole 20c of the second valve 20 have high pressure air from the first valve 10, the high pressure air is drained out from the first air guide hole 30a, second air guide hole 30b and third air guide hole 30c of the air guide plate 30 so that the residue air in the first tube 22a, second tube 22b and third tube 22c connected to the air inflation tubes 94a, 94b and 94c pass through the first channel 21a, second channel 21b and third channel 21c and are driven by the high pressure air drained from the first air hole 20a, second air hole 20b and third air hole 20c of the second valve 20 so as to be drained out of the second valve 20 through the first air guide hole 30a, second air guide hole 30b, and third air guide hole 30c, as illustrated in the flow lines of FIG. 8 so as to reduce the draining time of the air cushion bed.

Since the air guide plate 30 covers the first channel 21a, second channel 21b and third channel 21c of the second valve 20 so that the effect of high pressure air driving the residue air is promoted. Moreover, if the air guide plate 30 is not used, the cover plate 40 air-tightly covers the first channel 21a, second channel 21b and third channel 21c of the second valve 20 directly. The draining speed of the residue air can be increased.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A quick draining air valve, comprising:
   a first valve having an air inlet device for inputting high pressure air;
   a second valve having at least one channel which is extended to a surface of the second valve; a distal end of the channel extending with a tube which is connected to the air inflation tube; the second valve being connected to the first valve so that high pressure air enters into the tube through the channel and then into the air inflation tube; and
   a cover plate being openable, high pressure air providing by the first valve being drained out with a high speed from the second valve; by the channel of the second valve, residue air in the air inflation tube connected to the tube of the second valve is drained out from the second valve.

2. The quick draining air valve as claimed in claim 1, further comprising an air guide plate installed between the cover plate and a surface of the second valve for covering the channel of the second valve; the air guide plate having at least one air guide hole, when the cover plate is opened, high pressure air and residue air are drained out from the air guide hole.

3. The quick draining air valve as claimed in claim 1, wherein one side of the air guide hole has a pivotal groove and one side of the cover plate has a pivotal seat which is pivotally installed to the pivotal groove so that the cover plate is rotatable around the pivotal seat, and thus the cover plate can be opened or closed.

4. A quick draining air valve comprising:
   a first valve having an air inlet device which is connected to an compressor for providing air; a bottom of the first valve having a first air hole, a second air hole and a third air hole;
   a second valve; a top of the second valve having a first air hole, a second air hole, and a third air hole corresponding to the first air hole, second air hole and third air hole of the first valve; when the first valve being combined with the second air hole, the first air hole, second air hole and third air hole of the second valve being air-tightly connected to the first air hole, second air hole and third air hole of the first valve, respectively; the second valve being formed with a first channel, a second channel, and a third channel; front ends of the first channel, second channel and third channel being communicated to the first air hole, second air hole and third air hole of the second valve; the first channel, second channel and third channel being also connected to the first tube, second tube and third tube at one lateral side of the second valve so as to drain high pressure air to an air cushion through air inflation pipes;

an air guide plate fixed to a bottom of the second valve by using screws for sealing the first channel, second channel and third channel; the air guide plate being formed with a first air guide hole, a second air guide hole and a third air guide hole which are aligned to the first air hole, second air hole and third air hole of the second valve; and a cover plate air-tightly covering a bottom of the air guide plate so as to seal the first air guide hole, second air guide hole and third air guide hole; when the cover plate is opened, the high pressure air from the first valve will drain out from the air guide hole of the air guide plate through the air holes and channels of the second valve so as to drive residue air in the air inflation tube connected to the tube of the second valve.

5. The quick draining air valve as claimed in claim 4, wherein an interior of the first valve has an air distributor which is driven by a motor so that high pressure air is distributed to a first air hole, a second air hole and a third air hole at a bottom thereof.

6. The quick draining air valve as claimed in claim 4, wherein a bottom of the first valve is formed with a connecting block; the first air hole, second air hole and third air hole are opened on the connecting block; the first air hole provides high pressure air constantly; the second air hole and third air hole provides high pressure air alternatively; a top of the second air hole has a pair of buckling grooves for buckling the connecting block of the first valve so that the second and third air holes of second valve is combined to the second and third air holes of the first valve.

7. The quick draining air valve as claimed in claim 4, wherein an upper side of the first air guide hole is extended with a guide tube having a notch; the guide tube extends into the first channel of the second valve; and a distal end of the guide tube is near the first air hole of the second valve.

8. The quick draining air valve as claimed in claim 4, wherein one of the air guide plate is installed with a pivotal groove; and a cover plate has a pivotal seat at one side thereof for pivotally connecting the pivotal groove of the air guide plate so that the cover plate is rotatable along the pivotal seat.

9. The quick draining air valve as claimed in claim 4, wherein one side of the air guide plate has a buckling block; and another side of the cover plate opposite to the side installing the pivotal seat is installed with a buckling plate; when the cover plate covers upon the air guide plate, the buckling plate is buckled with the buckling block so that the cover plate is steadily retained.

10. The quick draining air valve as claimed in claim 4, wherein a bottom of the air guide plate is formed with a recess; a recess surface of the recess is formed with the air guide holes; a top surface of the cover plate is formed with a protrusion; when the cover plate is covered, the protrusion exactly enters into the recess.

11. The quick draining air valve as claimed in claim 4, wherein a periphery of the protrusion is enclosed by an airtight washer.

* * * * *